United States Patent
Okawa et al.

(10) Patent No.: US 10,046,359 B2
(45) Date of Patent: Aug. 14, 2018

(54) METHOD FOR MANUFACTURING ORIENTED FILM, AND METHOD FOR MANUFACTURING DISPLAY BODY

(71) Applicant: TOPPAN PRINTING CO., LTD., Tokyo (JP)

(72) Inventors: Mihoko Okawa, Tokyo (JP); Hideki Ochiai, Tokyo (JP); Kota Aono, Tokyo (JP); Yuki Kotegawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/230,743

(22) Filed: Aug. 8, 2016

(65) Prior Publication Data

US 2016/0339473 A1   Nov. 24, 2016

Related U.S. Application Data

(63) Continuation of application No. PCT/JP2015/054250, filed on Feb. 17, 2015.

(30) Foreign Application Priority Data

Feb. 17, 2014   (JP) .................................. 2014-027853

(51) Int. Cl.
   *B05D 3/06*   (2006.01)
   *G02B 5/30*   (2006.01)
   *G02F 1/1337*   (2006.01)

(52) U.S. Cl.
   CPC ............... *B05D 3/06* (2013.01); *G02B 5/30* (2013.01); *G02F 1/133753* (2013.01); *G02F 1/133788* (2013.01)

(58) Field of Classification Search
   CPC ......... G02F 1/133753; G02F 1/133788; G02B 5/30; B05D 3/06
   (Continued)

(56) References Cited

U.S. PATENT DOCUMENTS

2012/0229368 A1* 9/2012 Watanabe ............ G07D 7/0006
                                                  345/32
2013/0341903 A1* 12/2013 Ochiai .................... B41M 3/14
                                                  283/85

(Continued)

FOREIGN PATENT DOCUMENTS

JP   2009-258151 A    11/2009
JP   2011-53274 A  *   3/2011
JP   2013-109129 A *   6/2013

OTHER PUBLICATIONS

Machine translation of JP 2009-258151 A; published Nov. 5, 2009; by Kubo Akira et al.*

(Continued)

*Primary Examiner* — Marianne L Padgett
(74) *Attorney, Agent, or Firm* — Squire Patton Boggs (US) LLP

(57) ABSTRACT

An oriented film includes first to fourth regions having first to fourth orientation angles. First polarized light having a first intensity is radiated onto the first and second regions of a photosensitive film. Second polarized light having a second intensity is radiated onto the second and third regions of the photosensitive film. Third polarized light having a third intensity is radiated onto the first to fourth regions of the photosensitive film. The polarization angles of the first to third polarized light are different from each other. The second polarization angle is larger than the first polarization angle. The third polarization angle is larger than the second polarization angle. The polarization angle of the second or third polarized light radiated onto the third region is less than the third alignment angle. The third intensity is lower than the first intensity and the second intensity.

11 Claims, 9 Drawing Sheets

(58) Field of Classification Search
USPC ... 427/510, 511, 553, 7, 163.1, 163.3, 163.4
See application file for complete search history.

(56) References Cited

U.S. PATENT DOCUMENTS

2016/0052327 A1* 2/2016 Ohkawa ............... G02B 5/3083
                                                          356/71
2017/0001461 A1* 1/2017 Okawa ................ G02B 5/3033

OTHER PUBLICATIONS

Paul A. Tipler; Physics; worth publishers, Inc.; 1976 (no month); excerpt ("Polarization") pp. 623-630 & 1024.*
Lerner et al., editors; Encyclopedia of Physics, 2nd edition; VCH publishers, Inc.; New York; 1990 (no month); excerpts pp. 351-352, 937-940 & 1401.*
International Search Report for Application No. PCT/JP2015/054250, dated May 26, 2015, English translation.
International Preliminary Report on Patentability for Application No. PCT/JP2015/054250, dated Aug. 23, 2016; English translation, 7 pages.

* cited by examiner

METHOD FOR MANUFACTURING ORIENTED FILM, AND METHOD FOR MANUFACTURING DISPLAY BODY

BACKGROUND

The present disclosure relates to a method for manufacturing an oriented film in which latent images are stored while being overlaid on one another and to a method for manufacturing a display body that is provided with an oriented film.

Negotiable securities such as bank notes and gift certificates, and authenticated media such as passports have a display body, which is hard to counterfeit, in order to prevent a counterfeit thereof. Such a display body is used for the determination of authenticity by visual determination or by determination using a verification device. A display body of which the authenticity can be visually determined is easy to be counterfeited by another person. For this reason, in recent years, a display body is proposed that stores a latent image therein that is formed with the use of a polarization technology. The latent image stored in this display body appears when a filter, which is the verification device, is overlaid thereon.

For instance, Japanese Laid-Open Patent Publication No. 2009-258151 proposes a display body that stores latent images therein in such a state that the latent images are overlaid on each other. The display body stores two latent images that are overlaid on each other, by four regions having different orientation properties from each other.

An optical orientation method is known as a method for giving a plurality of different orientation properties from each other, to an oriented film with which the display body is provided. In the optical orientation method, a photosensitive film, which functions as the oriented film, is irradiated with polarized light, while four photomasks corresponding to the respective orientation directions are switched. In such a method, the positions of the photomasks need to be aligned with each other. When the four photomasks are switched, the positions of the photomasks with respect to the photosensitive film must be aligned with a precision of such a degree that these regions are precisely divided, the alignment of the photomasks is naturally difficult.

On the other hand, in a method of using one phase-difference filter, a photosensitive film needs only one-time irradiation with polarized light, but patterns corresponding to the above described four regions need to be formed in the one phase-difference filter. For this reason, a process of forming the phase difference filter is complicated, and as a result, a long time results in being spent on the manufacture of the phase difference filter. In addition, also when two phase-difference filters are used, it is difficult to align the positions of each of the phase difference filters with respect to the photosensitive film, similarly to the above described method using the photomask.

SUMMARY

An objective of the present disclosure is to provide a method for manufacturing an oriented film that easily manufactures an oriented film having four regions having different orientation directions from each other by using the optical orientation method, and to provide a method for manufacturing a display body.

In accordance with one aspect of the present invention, a method for manufacturing an oriented film is provided. The oriented film includes a first region having a first orientation angle $\theta 1$, a second region having a second orientation angle $\theta 2$, a third region having a third orientation angle $\theta 3$, and a fourth region having a fourth orientation angle $\theta 4$. The first orientation angle $\theta 1$, the second orientation angle $\theta 2$, the third orientation angle $\theta 3$, and the orientation angle $\theta 4$ satisfy the equations:

$$\theta 2 = \theta 1 + 22.5° + 90° \times L,$$

$$\theta 3 = \theta 1 + 45° + 90° \times M, \text{ and}$$

$$\theta 4 = \theta 1 + 67.5° + 90° \times N,$$

where L, M and N are integers that satisfy the equations $L=0+2\times 1$, $M=-1+2\times m$, and $N=0+2\times n$, respectively, where l, m and n represent integers, The method includes:

irradiating the first region and the second region of a photosensitive film with first polarized light having a first intensity;

irradiating the second region and the third region of the photosensitive film with second polarized light having a second intensity; and irradiating the first region, the second region, the third region and the fourth region of the photosensitive film with third polarized light having a third intensity.

Polarization angles of the first polarized light, the second polarized light and the third polarized light are different from each other. The three polarization angles include a first polarization angle, a second polarization angle, which is larger than the first polarization angle, and a third polarization angle, which is larger than the second polarization angle. The polarization angle of one of the second polarized light and the third polarized light, with which the third region is irradiated, is smaller than the third orientation angle $\theta 3$. The third intensity is lower than the first intensity and the second intensity.

In another aspect, a method for manufacturing a display body is provided. The method includes forming the oriented film and forming a phase difference layer that covers the oriented film.

DESCRIPTION OF EXEMPLARY EMBODIMENTS

A method for manufacturing an oriented film and a method for manufacturing a display body according to one embodiment of the present disclosure will be described with reference to FIGS. 1 to 21.

[Structure of Oriented Film]

A structure of the oriented film will be described below with reference to FIG. 1.

Figure 1:
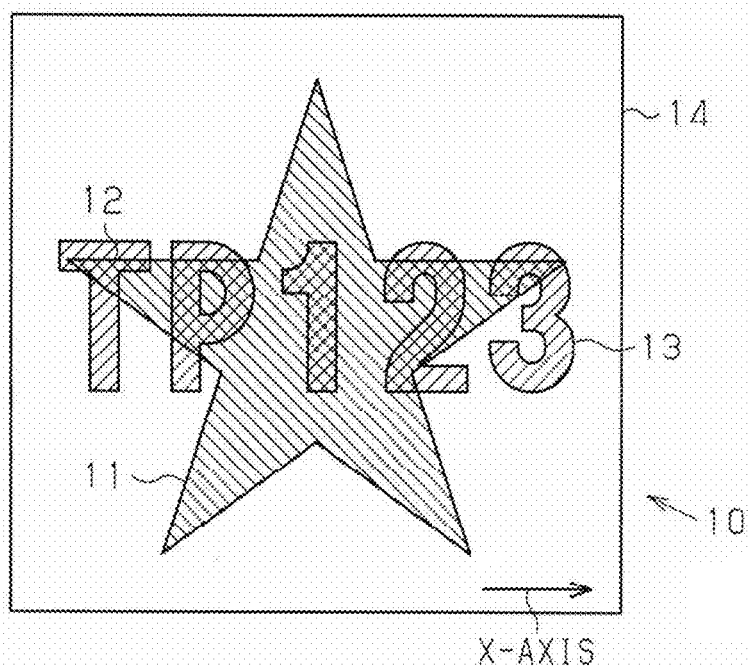
FIG. 1 is a plan view showing a planar structure of an oriented film that is manufactured according to a method for manufacturing an oriented film of the present disclosure.

As shown in FIG. 1, an oriented film 10 has a function of orienting molecules that form a phase difference layer positioned on the oriented film 10 and has a first region 11, a second region 12, a third region 13 and a fourth region 14 therein. In each of the first region 11 to the fourth region 14, directions in which the orientations of the molecules in the phase difference layers are regulated, in other words, orientation angles, which are angles formed with respect to an X-axis, which is an arbitrary straight line parallel to the plane of the oriented film 10, are different from each other.

The orientation angle in the first region 11 is a first orientation angle $\theta 1$, the orientation angle in the second region 12 is a second orientation angle $\theta 2$, the orientation angle in the third region 13 is a third orientation angle $\theta 3$, and the orientation angle in the fourth region 14 is a fourth orientation angle $\theta 4$. At this time, each of the first orientation angle $\theta 1$ to the fourth orientation angle $\theta 4$ satisfies the following equations concerning each of the orientation angles.

$$\theta 2 = \theta 1 + 22.5° + 90° \times L \quad \text{(Eq. 1)}$$

$$\theta 3 = \theta 1 + 45° + 90° \times M \quad \text{(Eq. 2)}$$

$$\theta 4 = \theta 1 + 67.5° + 90° \times N \quad \text{(Eq. 3)}$$

In the above described Equation 1 to Equation 3, L, M and N are integers that satisfy $L = 0 + 2 \times 1$, $M = -1 + 2 \times m$ and $N = 0 + 2 \times n$, respectively, when l, m and n represent integers.

In the oriented film 10, when an angle formed by a polarization axis of the polarized light that has been incident on the oriented film 10 and the X-axis has a first predetermined size, the first region 11 and the second region 12 have substantially equal transmissivity, and the third region 13 and the fourth region 14 have substantially equal transmissivity. Therefore, in the oriented film 10, a starlike shape becomes visible as a first image, which is a shape that is formed by the first region 11 and the second region 12. In the starlike shape, a portion except a character string is the first region 11, and the portion of the character string is the second region 12.

In addition, in the oriented film 10, when the angle formed by the polarization axis of the polarized light and the above described straight line has a second predetermined size, which is different from the first predetermined size, the second region 12 and the third region 13 have substantially equal transmissivity, and the first region 11 and the fourth region 14 have substantially equal transmissivity. Therefore, in the oriented film 10, the character string "TP123" becomes visible as a second image, which is a shape that is formed of the second region 12 and the third region 13. In the character string, the portion that is positioned outside the starlike shape is the third region 13.

In other words, the oriented film 10 stores a latent image having the starlike shape that is formed of the first region 11 and the second region 12, and a latent image of the character string, which is formed of the second region 12 and the third region 13 therein, in a state in which the latent images are overlaid on each other.

The material for forming the photosensitive film, which is a precursor of the oriented film 10, is, for instance, any one of an azobenzene derivative, a cinnamate ester, coumarin, chalkone, benzophenone and polyimide. When the material for forming the oriented film 10 is the azobenzene derivative, in the oriented film 10, the azobenzene derivative is photo-isomerized by irradiation with the polarized light, and thereby the oriented film 10 has a predetermined orientation angle. When the material of forming the oriented film 10 is the cinnamate ester, the coumarin, the chalkone and the benzophenone, in the oriented film 10, these derivatives are photo-dimerized or photo-crosslinked by irradiation with the polarized light, and thereby the oriented film 10 has a predetermined orientation angle. When the material for forming the oriented film 10 is the polyimide, in the oriented film 10, the polyimide is photo-decomposed by irradiation with the polarized light, and thereby the oriented film 10 has a predetermined orientation angle.

[Method for Manufacturing Oriented Film]

A method for manufacturing an oriented film will be described below with reference to FIGS. 2 to 10.

Figure 2:
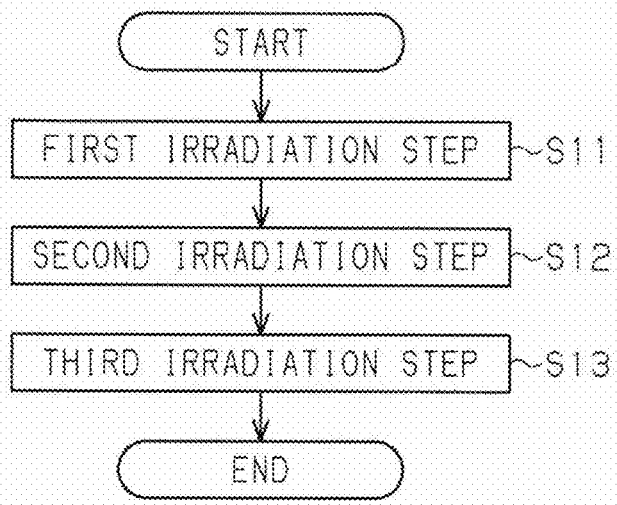
FIG. 2 is a flowchart showing a procedure of processing in the method for manufacturing the oriented film.

As shown in FIG. 2, the method for manufacturing the oriented film 10 includes a first irradiation step of irradiating a photosensitive film with first polarized light (step S11), a second irradiation step of irradiating the photosensitive film with second polarized light (step S12), and a third irradiation step of irradiating the photosensitive film with third polarized light (step S13). The angles of the polarized light with which the photosensitive film is irradiated in each of the first irradiation step to the third irradiation step, are different from each other. In addition, in each of the first irradiation step to the third irradiation step, regions of the photosensitive film that are irradiated with the corresponding polarized light have portions in which the regions are overlaid on each other. In the first irradiation step and the second irradiation step, parts of the regions irradiated with the polarized light are overlaid on each other. In the following, the first irradiation step to the third irradiation step will be sequentially described, in one example of the method for manufacturing the oriented film 10.

Figure 3:
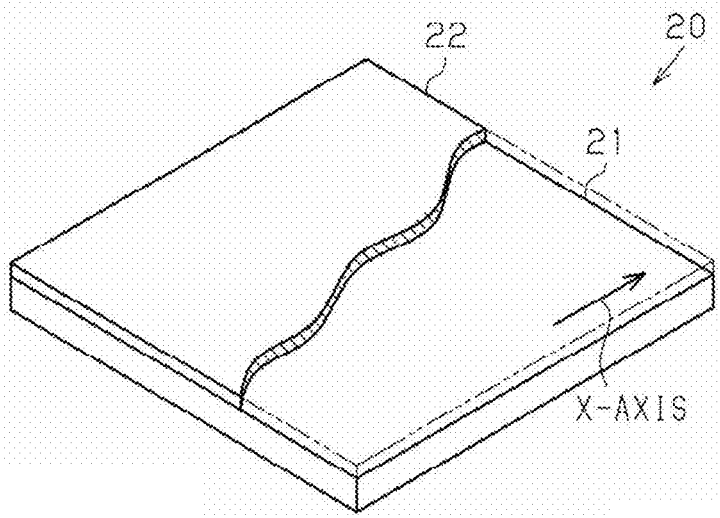
FIG. 3 is a perspective view showing a perspective structure in a state in which a photosensitive substrate having a photosensitive film, which is a precursor of an oriented film, is partly removed.

As shown in FIG. 3, in each of the irradiation steps, a photosensitive substrate 20, for instance, having a rectangular plate shape is irradiated with various types of polarized light. The photosensitive substrate 20 includes a supporting substrate 21, and a photosensitive film 22, which is formed on one surface of the supporting substrate 21.

The supporting substrates 21 may be any one of a non-drawn film, which is formed by extrusion or casting, and a drawn film, which is formed by stretching. When the supporting substrate 21 is a drawn film, the supporting substrate 21 may be a uniaxially drawn film or a biaxially drawn film.

The material for forming the supporting substrate 21 is any one of cellophane, polycarbonate (PC), polyethylene (PE), polypropylene (PP), polyolefin (PO), ethylene vinyl alcohol (EVOH), polyvinyl alcohol (PVA), polyvinyl chloride, polyethylene naphthalate (PEN), polyethylene terephthalate (PET), nylon, an acrylic resin, and triacetyl cellulose (TAC), for instance.

The material for forming the photosensitive film 22 may be any one of the above described materials. As the photosensitive film 22, such forming materials may be applied onto one surface of the supporting substrate 21 with the use of any one of coating methods including a gravure coating method and a micro gravure coating method.

Figure 4:
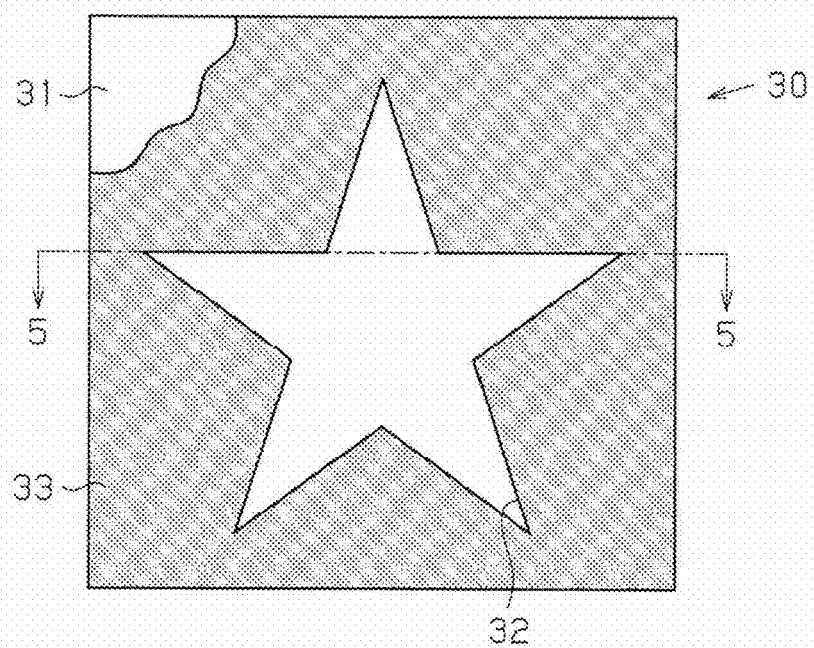
FIG. 4 is a plan view showing a planar structure in a state in which a first mask is partially removed.

As shown in FIG. 4, in the first irradiation step, the photosensitive film 22 is irradiated with polarized light, with the use of a first mask 30. The first mask 30 includes a mask substrate 31, which is transparent and does not have birefringence, and a first light-shielding portion 33, which has a first opening 32. FIG. 4 shows the first light-shielding portion 33, on which dots are added, and shows the mask substrate 31, on which a part of the first light-shielding portion 33 is removed, for purposes of illustrations. The material for forming the mask substrate 31 may be any one of plastic and glass, for instance.

The material for forming the first light-shielding portion 33 may be a light-shielding resist, or may be light-shielding ink, which is applied onto the mask substrate 31. The first light-shielding portion 33 has the first opening 32, through which a part of the mask substrate 31 is exposed, for instance, substantially in the middle of the first light-shielding portion 33, and the first opening 32 has a starlike shape as the shape that corresponds to the first region 11 and the second region 12, in the present embodiment.

When the first light-shielding portion 33 is formed of the resist, in other words, when the material that forms the first light-shielding portion 33 is the resist, the first opening 32 may be formed through a process of patterning the first light-shielding portion 33 with photolithography. On the other hand, when the first light-shielding portion 33 is formed of the ink, the first opening 32 may be formed simultaneously with the first light-shielding portion 33, when the first light-shielding portion 33 is formed by a printing method. In the above description, the first mask 30 is manufactured with the use of the printing method, and thereby the cost for manufacturing the first mask 30 can be reduced.

Figure 5:
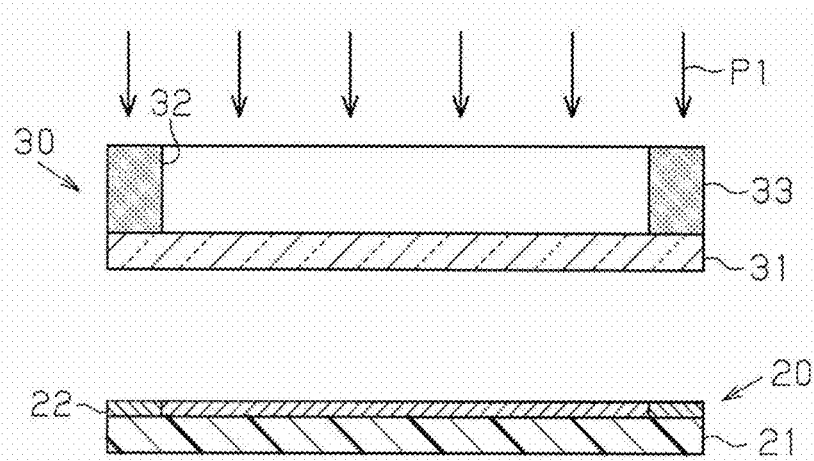
FIG. 5 is an explanatory process chart of a first irradiation step.

As shown in FIG. 5, in a state in which the first mask 30 is positioned on top of the photosensitive substrate 20, and the photosensitive film 22 of the photosensitive substrate 20 faces the mask substrate 31 of the first mask 30, the photosensitive substrate 20 is irradiated with first polarized light P1 having a first polarization angle θa. The angle formed by the polarization axis of the first polarized light P1 and the X-axis of the photosensitive film 22 is the first polarization angle θa, and the first polarization angle θa is, for instance, −9°.

The first polarized light P1 may be linearly polarized light, or may also be natural light. When the first polarized light P1 is the natural light, the photosensitive film 22 is irradiated with the natural light, in a state in which the photosensitive film 22 and the irradiation direction of the natural light have a predetermined angle therebetween, and thereby the photosensitive film 22 is irradiated with the polarized light. The photosensitive film 22 is irradiated with the first polarized light P1, which has the first intensity I1. The first intensity I1 of the first polarized light P1 is, for instance, 86.4 mJ/cm$^2$.

When the photosensitive substrate 20 is irradiated with the first polarized light P1, a site in the photosensitive film 22 that faces the first opening 32 with the mask substrate 31 in between is irradiated with the first polarized light P1. Thereby, in the portion in the photosensitive film 22, which has been irradiated with the first polarized light P1, a part of the molecules that constitute the photosensitive film 22 is anisotropically rearranged, or a chemical reaction anisotropically progresses in a part of the molecules which constitute the photosensitive film 22. As a result, a part of the portion in the photosensitive film 22, which has been irradiated with the first polarized light P1, has an orientation angle that corresponds to the first polarization angle θa of the first polarized light P1.

By the first irradiation step, the portions in the photosensitive film 22 that correspond to the first region 11 and the second region 12 in the oriented film 10 are irradiated with the first polarized light P1.

Figure 6:
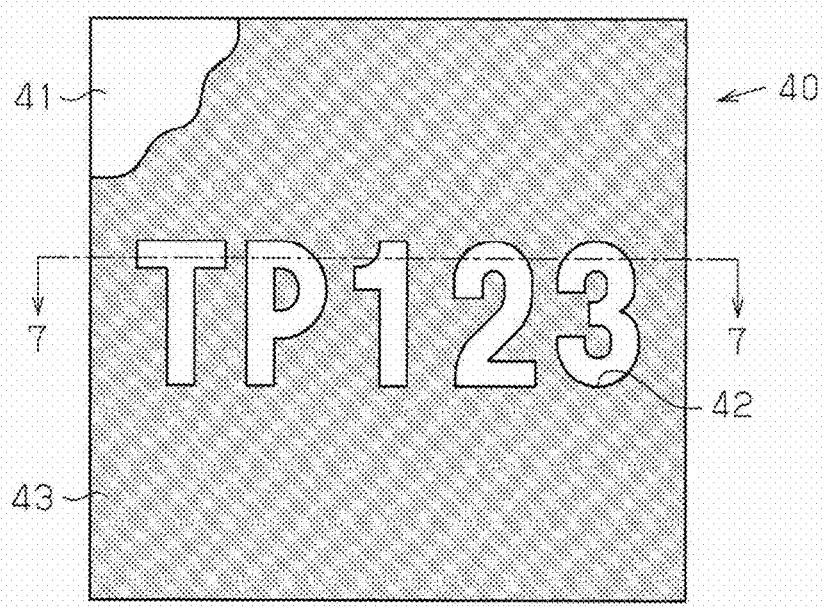
FIG. 6 is a plan view showing a planar structure in a state in which a second mask is partially removed.

As shown in FIG. 6, in the second irradiation step, the photosensitive film 22 is irradiated with polarized light with the use of the second mask 40. Similarly to the first mask 30, the second mask 40 includes a mask substrate 41, which is transparent and does not have birefringence, and a second light-shielding portion 43, which has a second opening 42 therein. FIG. 6 shows the second light-shielding portion 43, on which dots are added, and shows the mask substrate 41, on which a part of the second light-shielding portion 43 is removed, for purposes of illustrations. The material for forming the mask substrate 41 may be any one of the above described materials for forming the mask substrate 31.

The material for forming the second light-shielding portion 43 may also be a light-shielding resist or may also be a light-shielding ink, similarly to that for the above described first light-shielding portion 33. The second light-shielding portion 43 has a second opening 42, through which a part of the mask substrate 41 is exposed, in a position that is, for instance, substantially the middle of the second light-shielding portion 43, and on which the second opening 42 is overlaid on a part of a portion onto which the first opening 32 has been transferred, when the shape of the second opening 42 has been transferred onto the photosensitive film 22. The second opening 42 has a shape corresponding to a character string "TP123" in the present embodiment, as a shape which corresponds to the second region 12 and the third region 13. Similarly to the first opening 32, the second opening 42 is formed by a method of having coped with the material for forming the second light-shielding portion 43.

Figure 7:
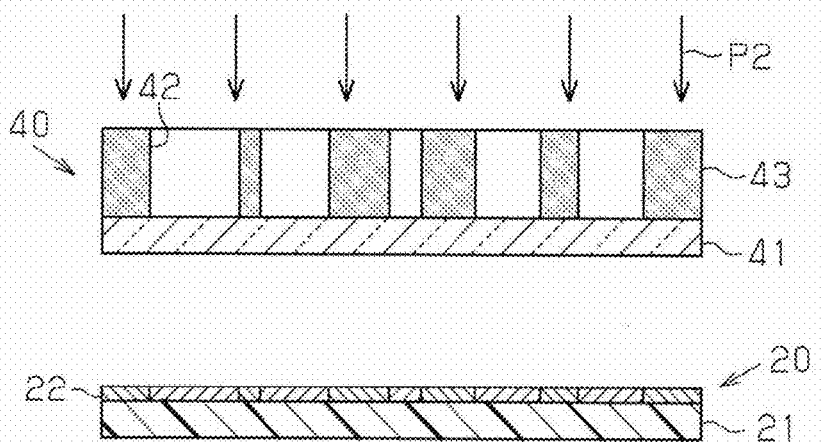
FIG. 7 is an explanatory process chart of a second irradiation step.

As shown in FIG. 7, in a state in which the second mask 40 is positioned on top of the photosensitive substrate 20, which has been irradiated with the first polarized light P1, and the photosensitive film 22 of the photosensitive substrate 20 faces the mask substrate 41 of the second mask 40, the photosensitive substrate 20, which has been irradiated with the first polarized light P1 is irradiated with second polarized light P2, which has the second polarization angle θb. The second polarization angle θb of the second polarized light P2 is, for instance, larger than the first polarization angle θa of the first polarized light P1, and the second polarization angle θb is, for instance, 36°. The second polarized light P2 may be linearly polarized light, or may also be natural light, similarly to the first polarized light P1. Second intensity I2, which is the intensity of the second polarized light P2, is, for instance, smaller than the first intensity I1, and is, for instance, 64.8 mJ/cm².

The portions in the photosensitive film 22 are irradiated with the second polarized light P2, which correspond to the second region 12 and the third region 13 in the oriented film 10, through the second mask 40.

Figure 8:
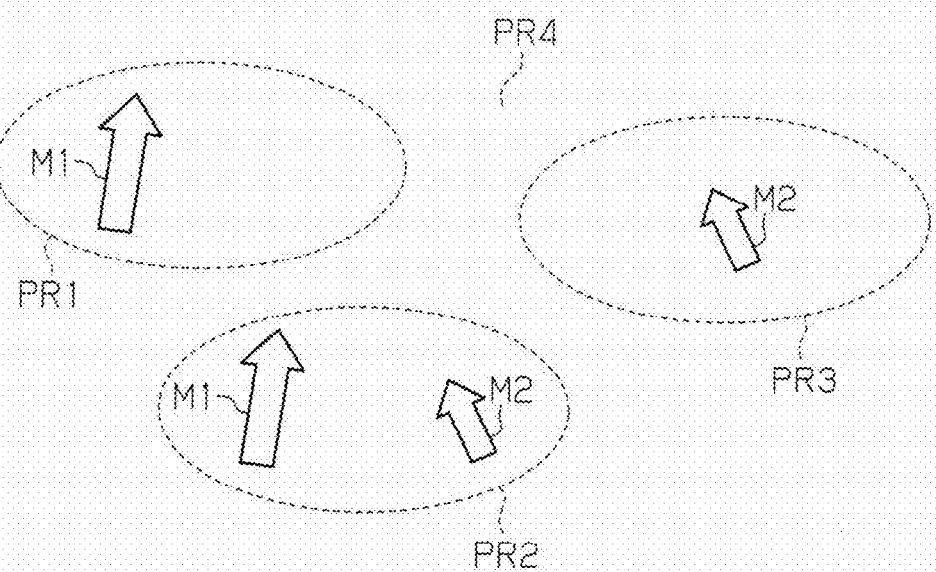
FIG. 8 is a schematic diagram schematically showing a state of a photosensitive film when the first irradiation step and the second irradiation step have been finished.

As shown in FIG. 8, when the photosensitive substrate 20 is irradiated with the second polarized light P2 with the use of the second mask 40, the position of the second mask 40 is aligned with respect to the photosensitive film 22. At this time, the second opening 42 of the second mask 40 contains a portion facing a site that has been irradiated with the first polarized light P1 in the photosensitive film 22, and a portion facing a site that is not irradiated with the first polarized light P1 in the photosensitive film 22. Therefore, when the photosensitive film 22 is irradiated with the second polarized light P2, regions are formed in the photosensitive film 22, which are a first precursor region PR1, which has been irradiated with the first polarized light P1, and a second precursor region PR2, which has been irradiated with the first polarized light P1 and the second polarized light P2. In addition, regions are formed in the photosensitive film 22, which are a third precursor region PR3, which has been irradiated with the second polarized light P2, and a fourth precursor region PR4, which has not been irradiated with the first polarized light P1 and the second polarized light P2. FIG. 8 schematically shows directions in which molecules are oriented, by directions of arrows, and schematically shows the intensity of the orientation, by the sizes of the arrows.

When the photosensitive film 22 is irradiated with the first polarized light P1, which has the first polarization angle $\theta a$, in the first irradiation step, a first orientation-regulating force, which is a force of regulating the orientation of orienting the molecules, for instance, of a liquid crystal or the like into a first regulation angle, is given to the first precursor region PR1 and a part of molecules M1, which constitute the first precursor region PR1. At this time, the first orientation-regulating force is not given to all of the molecules that constitute each of the first precursor region PR1 and the second precursor region PR2.

In more detail, the first orientation-regulating force is given to the molecules M1, which are, for instance, 10% or more and 80% or less of molecules that constitute each of the first precursor region PR1 and the second precursor region PR2, by the irradiation with the first polarized light P1, according to the efficiency of the reaction of developing the orientation property in the molecules and the first intensity I1 of the first polarized light P1. In the molecules that constitute the photosensitive film 22, as the efficiency of the reaction of developing the orientation property is high, the number of the molecules to which the first orientation-regulating force is given increases, and as the first intensity I1 of the first polarized light P1 is high, the number of the molecules to which the first orientation-regulating force is given increases.

When the photosensitive film 22 is irradiated with the second polarized light P2, which has the second polarization angle $\theta b$, in the second irradiation step, a second orientation-regulating force, which is a force of regulating the orientation of the other molecules of the liquid crystal or the like into a second regulation angle, is given to a part of molecules M2, which constitute the second precursor region PR2 and the third precursor region PR3. At this time, in the second precursor region PR2, the second orientation-regulating force is given to the molecules M2, which are unreacted molecules and have not been reacted by the irradiation with the first polarized light P1, among the molecules that constitute the second precursor region PR2, and are 10% or more and 80% or less of the unreacted molecules. Thus, the second precursor region PR2 contains the molecules M1 and M2, in which directions of the forces of regulating the orientation are different from each other.

Figure 9:
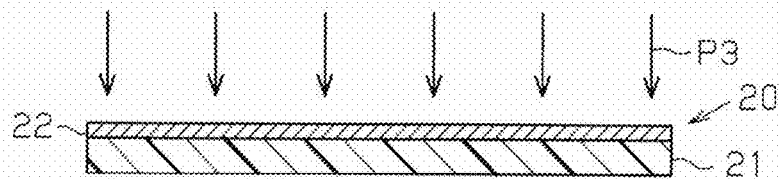
FIG. 9 is an explanatory process chart of a third irradiation step.

On the other hand, in the third precursor region PR3, the second orientation-regulating force is given to the molecules M2, which are 10% or more and 80% or less of the molecules that constitute the third precursor region PR3. As shown in FIG. 9, in the third irradiation step, the entire photosensitive film 22 is irradiated with the polarized light. In the third irradiation step, the photosensitive substrate 20 is irradiated with third polarized light P3, which has a third polarization angle $\theta c$ that is larger than the first polarization angle $\theta a$ and the second polarization angle $\theta b$. The third polarization angle $\theta c$ of the third polarized light P3 is, for instance, 67.5°. The third polarized light P3 may be linearly polarized light, or may also be natural light, similarly to the first polarized light P1. The photosensitive film 22 is irradiated with the third polarized light P3, which has a third intensity I3 lower than the second intensity I2, for instance, 36 mJ/cm².

Figure 10:
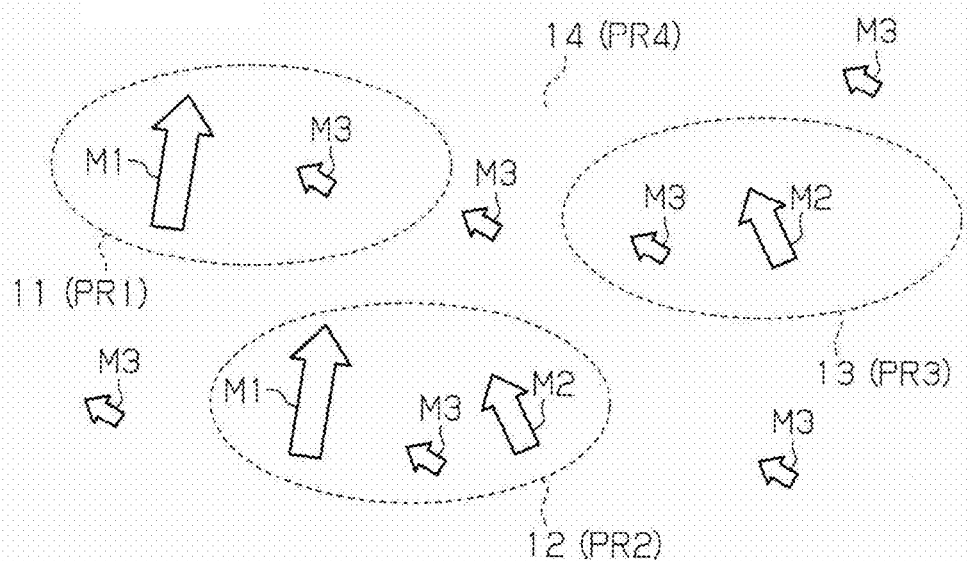
FIG. 10 is a schematic diagram schematically showing a state of the oriented film when the third irradiation step has ended.

As shown in FIG. 10, in the third irradiation step, all of the first precursor region PR1, the second precursor region PR2, the third precursor region PR3, and the fourth precursor region PR4 are irradiated with the third polarized light P3. FIG. 10 schematically shows directions in which the molecules are oriented by the directions of the arrows and schematically shows the intensity of the orientation by the sizes of the arrows similarly to FIG. 8.

At this time, in the first precursor region PR1, a third orientation-regulating force, which is a force of regulating the orientation in the direction of the third regulation angle, is given to molecules M3, which are unreacted molecules that have not been reacted by the irradiation with the first polarized light P1 among the molecules that constitute the first precursor region PR1, and are, for instance, 10% or more and 80% or less of the unreacted molecules. Thereby, the first region 11 is formed in the photosensitive film 22, and the first region 11 contains the molecules M1 and the molecules M3, in which the directions of the forces of regulating the orientation are different from each other.

In the second precursor region PR2, the third orientation-regulating force is given to molecules M3, which are unreacted molecules that have not been reacted by any of the irradiation with the first polarized light P1 and the irradiation with the second polarized light P2, among the molecules that constitute the second precursor region PR2, and are, for instance, 10% or more and 80% or less of unreacted molecules. Thereby, the second region 12 is formed in the photosensitive film 22, and the second region 12 contains the molecules M1 the molecules M2 and the molecules M3, in which the directions of the forces of regulating the orientation are different from each other.

In the third precursor region PR3, the irradiation with the third polarized light P3 gives the third orientation-regulating force to the molecules M3, which are unreacted molecules that have not been reacted by the irradiation with the second polarized light P2, among the molecules that constitute the third precursor region PR3, and are, for instance, 10% or more and 80% or less of the unreacted molecules. Thereby, the third region 13 is formed in the photosensitive film 22, and the third region 13 contains the molecules M2 and the molecules M3, in which the directions of the forces of regulating the orientation are different from each other.

In the fourth precursor region PR4, the third orientation-regulating force is given to the molecules M3, which are, for instance, 10% or more and 80% or less of the molecules that constitute the fourth precursor region PR4. Thereby, the fourth region 14 is formed in the photosensitive film 22, and the fourth region 14 contains only the molecules M3, as molecules having the forces of regulating the orientation.

Thus, among the plurality of regions of the oriented film 10, the first region 11, the second region 12, and the third region 13 are formed of the molecules in which the directions of the forces of regulating the orientation are different from each other. Therefore, the orientation angle of the entirely of each regions is determined by an interaction among the forces of regulating the orientations. Specifically, the orientation angle in each of the regions is determined by the polarization angle and the intensity of the polarized light that is emitted in each of the irradiation steps.

For instance, when the first intensity I1 of the first polarized light P1 is largest and the third intensity I3 of the third polarized light P3 is smallest, as has been described above, the force of regulating the orientation, which the first polarized light P1 gives to the molecules M1, is dominant in each of the orientation angles of the region containing the molecules M1. On the other hand, the force of regulating the orientation, which the second polarized light P2 gives to the molecules M2, and the force of regulating the orientation, which the third polarized light P3 gives to the molecules M3, are smaller than the force of regulating the orientation, which the first polarized light P1 gives to the molecules M1, but has no small effect on the orientation angle of the region containing the molecules M2 and the molecules M3. In the third region 13, which does not contain the molecules M1, the force of regulating the orientation, which the second polarized light P2 gives to the molecules M2, is dominant in the third orientation angle θ3 of the third region 13, and in the fourth region 14 that contains only the molecules M3, the force of regulating the orientation, which the third polarized light P3 gives to the molecules M3, determines the fourth orientation angle θ4 of the fourth region 14.

In this point, since the first region 11 is irradiated with the first polarized light P1 and the third polarized light P3 having a larger angle than that of the first polarized light P1, it is preferable that the first polarization angle θa of the first polarized light P1 be smaller than the first orientation angle θ1 of the first region 11. Thereby, it is difficult for the first orientation angle θ1 of the first region 11 to exceed a desired orientation angle.

Since the third region 13 is irradiated with the second polarized light P2 and the third polarized light P3 having a larger angle than that of the second polarized light P2, it is preferable that the second polarization angle θb of the second polarized light P2 be smaller than the third orientation angle θ3 of the third region 13. Thereby, it is difficult for the third orientation angle θ3 to exceed a desired orientation angle. Since the fourth region 14 is irradiated with only the third polarized light P3, the third polarization angle θc of the third polarized light P3 is set at an angle equal to the fourth orientation angle θ4 of the fourth region 14.

[Structure of Display Body]

The structure of a display body will be described below with reference to FIGS. 11 to 13.

Figure 11:
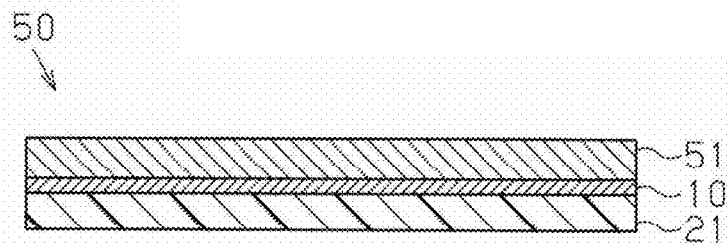
FIG. 11 is a cross-sectional view showing a cross-sectional structure of a display body.

As shown in FIG. 11, a display body 50 includes a supporting substrate 21, an oriented film 10, and a phase difference layer 51.

The material for forming the phase difference layer 51 has birefringence. In the layer that is formed of the material having the birefringence, a refractive index varies depending on the direction of the optical axis of light with which the layer has been irradiated. Therefore, when rays pass through the inside of the layer, the refractive indices of the rays in which the directions of the optical axes are different from each other are different from each other. Thus, the speeds of the rays passing through the inside of the layer are also different from each other. As a result, in the rays after having passed through the layer, a phase difference occurs among the rays by the difference among the speeds of the rays passing through the layer.

The material for forming the phase difference layer 51 is, for instance, a liquid crystal material. The liquid crystal materials are, for instance, a photo-curing type liquid crystal monomer that has an acrylate in both ends of a mesogenic group, a high-molecular liquid crystal that is cured by irradiation with an electron beam or ultraviolet rays, a high-molecular liquid crystal in which the mesogenic group is bonded to the main chain of the polymer in a state of being branched from the main chain, a liquid-crystal high polymer in which the main chain of the molecule is oriented according to the force of regulating the orientation, and the like. When these liquid crystal materials are applied onto the oriented film 10, the liquid crystal molecules contained in the liquid crystal material are thereby oriented according to the anisotropic array of the molecules which constitute the oriented film 10, and the like. When the liquid crystal material is subjected to heat treatment at a temperature that is lower than an NI point by substantially 5° C., which is a temperature at which the phase transition of the liquid crystal occurs from the pneumatic phase, which is one of liquid crystal phases, to the isotropic phase, after having been applied onto the oriented film 10, the orientation of the liquid crystal material is thereby promoted.

Figure 12:
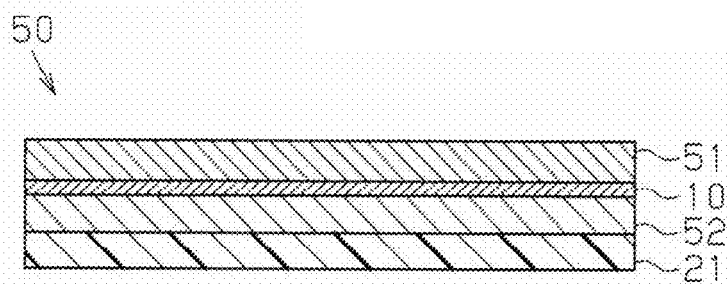
FIG. 12 is a cross-sectional view showing the cross-sectional structure of the display body.

As shown in FIG. 12, the display body 50 may have a reflective layer 52 provided between the supporting substrate 21 and the oriented film 10. The material for forming the reflective layer 52 is at least one metal selected from the group, for instance, consisting of Al, Sn, Cr, Ni, Cu, Au, Ag and the like, a compound of at least one metal selected from the group, or the like. In addition, the reflective layer 52 may be a transparent layer that is substantially transparent with respect to light perpendicular to one surface of the reflective layer 52, in other words, to a plane that is parallel to a surface on which a plurality of regions is formed in the oriented film 10, and on the other hand, shows reflective characteristics according to a refractive index corresponding to oblique light that forms a predetermined angle other than a perpendicular angle with respect to the surface. The reflective layer 52 like this may be formed of a single layer, or may also be formed of a plurality of layers.

The material for forming the transparent reflective layer 52 is one of ceramic and an organic polymer, for instance. When the material for forming the reflective layer 52 is the ceramic, the ceramic is any one of $Fe_2O_3$, $TiO_2$, CdS, $CeO_2$, ZnS, $PbCl_2$, CdO, $WO_3$, SiO, $Si_2O_3$, $In_2O_3$, PbO, $Ta_2O_3$, ZnO, $ZrO_2$, MgO, $SiO_2$, $MgF_2$, $CeF_3$, $CaF_2$, $AlF_3$, $Al_2O_3$, GaO and the like, for instance. When the material for forming the reflective layer 52 is the organic polymer, the organic polymer is polyethylene, polypropylene, polytetrafluoroethylene, polymethyl methacrylate, polystyrene and the like, for instance.

When the material for forming the reflective layer 52 is, for instance, the above described metal, metal compound and ceramic, the method for forming the reflective layer 52 is a vacuum evaporation method, a sputtering method, a CVD method and the like. On the other hand, when the material for forming the reflective layer 52 is the organic polymer, the method for forming the reflective layer 52 may be various printing methods.

Figure 13:
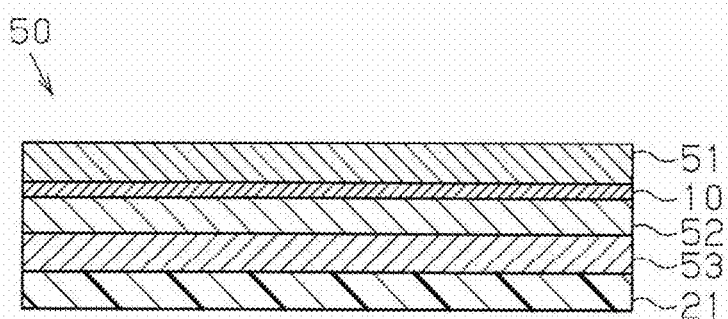
FIG. 13 is a cross-sectional view showing the cross-sectional structure of the display body.

As shown in FIG. 13, the display body 50 may have a relief forming layer 53 provided between the supporting substrate 21 and the reflective layer 52. When the display body 50 has the relief forming layer 53, the display body 50 has the reflective layer 52 along one surface of the relief forming layer. The relief forming layer 53 has, for instance, a relief type hologram that uses the interference of light, or a fine uneven structure for constituting a diffraction grating.

The material for forming the relief forming layer 53 is preferably a material that can be deformed by heating. Furthermore, the material for forming the relief forming layer 53 is preferably a material which resists causing unevenness when having been deformed by pressing, and can obtain a bright reproduced image when the relief forming layer 53 has a relief type hologram.

The material for forming the relief forming layer 53 may be at least one in the group, for instance, consisting of a thermoplastic resin, a urethane resin, a thermosetting resin, and an ultraviolet curing or electron beam curable resin. When the material for forming the relief forming layer 53 is the thermoplastic resin, the thermoplastic resin is an acrylic resin, an epoxy-based resin, a cellulose-based resin, a vinyl-based resin, and the like. When the material for forming the relief forming layer 53 is the urethane resin, the urethane resin is a resin that is formed by adding polyisocyanate as a crosslinking agent to acrylic polyol or polyester polyol, which has a reactive hydroxyl group, or by crosslinking the compounds, or the like. When the material for forming the relief forming layer 53 is the thermoplastic resin, the thermoplastic resin is a melamine-based resin, a phenol-based resin, and the like. When the material for forming the relief forming layer 53 is the ultraviolet curing or electron beam curable resin, the ultraviolet curing or electron beam curable resin is epoxy (meth) acrylate, urethane (meth) acrylate, and the like. In addition, even though the material is a resin other than the above described resins, if the material is a resin that can form the uneven structure, the material may be selected as the material for forming the relief forming layer 53.

The uneven structure of the relief forming layer 53 is transferred, for instance, onto the resin layer after the layer formed from the above described resin has been formed on the supporting substrate 21, by such a process that the resin layer is heated and pressurized with the use of a pressing plate having a relief pattern corresponding to the uneven structure. After that, the reflective layer 52 is formed on the uneven structure of the relief forming layer 53, with the use of the above described vacuum evaporation method or the like. Thereby, the reflective layer 52 is formed along the uneven structure of the relief forming layer 53.

In the phase difference layer 51, a phase difference value δ is determined by a birefringence Δn of the liquid crystal material, and by a thickness Th of the phase difference layer 51. The birefringence Δn is the difference between a refractive index no of an ordinary ray o in the liquid crystal material, and a refractive index ne of an extraordinary ray e in the liquid crystal material, and is expressed by the following equation.

$$\Delta n = ne - no \tag{Eq. 4}$$

The phase difference value δ is expressed by the following equation, which uses the birefringence Δn and the thickness Th of the phase difference layer 51.

$$\delta = \Delta n \times Th \tag{Eq. 5}$$

For instance, when a verification device of the display body 50 is a linear polarizer, and the display body 50 has the reflective layer 52, the phase difference value δ is preferably ¼λ with respect to a wavelength λ, which is a design wavelength. Furthermore, when the supporting substrate 21 of the oriented film 10 is a transparent substrate, the linear polarizer is positioned on a surface of the supporting substrate 21 on an opposite side to the oriented film 10, and the verification device of the display body 50 is the linear polarizer, the phase difference value δ is preferably ½λ. In addition, when the supporting substrate 21 of the oriented film 10 is a transparent substrate and a circular polarizer is positioned on the surface of the supporting substrate 21 on the opposite side to the oriented film 10, and the verification device of the display body 50 is the circular polarizer, the phase difference value δ is preferably ⅛λ. In any case, the phase difference value δ may be any one of ¼λ, ½λ, and ⅛λ.

The wavelength λ is preferably set at, for instance, a wavelength with which an observer can recognize an image at the highest sensitivity, or a wavelength that a reading device can detect at the highest sensitivity. When the observer visually observes the display body 50, for instance, a wavelength corresponding to green light, which is light having the highest visibility among visible light, may be set at the wavelength λ. Alternatively, in order to make it difficult for a third person to notice that the display body 50 is likely to store the latent image therein, a wavelength having lower visibility than the wavelength corresponding to the green light may be set at the wavelength λ.

In addition, the display body 50 like this is manufactured by being subjected to a step of forming a phase difference layer, in which the phase difference layer 51 is formed on the oriented film 10, after the steps of forming the oriented film, which include the above described first irradiation step to the third irradiation step.

[Operation of Display Body]

The function of the display body 50 will be described below with reference to FIGS. 14 to 21. Each of FIGS. 14 to 21 is a plan view showing an image displayed when the display body 50 is located between a pair of polarization filters and is observed. Each of FIGS. 14 to 21 shows a state in which an image that becomes visible on the display body 50 changes when a polarization axis angle θP is changed among a plurality of angles between 0° and 90°. In the following, the function of one example of the display body 50 will be described in which the phase difference value δ of the phase difference layer 51 is ½λ.

When the phase difference value δ of the phase difference layer 51 is ½λ, if the linearly polarized light has been incident on the phase difference layer 51, the polarization axis of the linearly polarized light is reversed with respect to the orientation direction of the phase difference layer 51. In other words, when the angle formed by the polarization axis of the incident light and the orientation direction of the phase difference layer 51 is θ, the angle formed by the polarization axis of the incident light and the polarization axis of the transmitted light is 2θ.

When the display body 50 is observed by parallel nicols, transmissivity T of the incident light in the oriented film 10 is expressed by the following Equation 6.

$$T = 100 \times \cos^2\left[\left(\frac{\pi}{180°}\right) \times 2\theta\right] \quad \text{(Eq. 6)}$$

As has been described above, the oriented film 10 includes the first region 11, the second region 12, the third region 13 and the fourth region 14, which have different orientation angles from each other. Therefore, in the display body 50, the phase difference layer 51, which is overlaid on the oriented film 10, has also the four regions having orientation angles that are different from each other and correspond to the first region 11 to the fourth region 14 in the oriented film 10. When the observer has made the linearly polarized light incident on the display body 50 and has observed light that is emitted from the display body 50 through the polarization filter, the transmissivity T in each of the first region 11 to the fourth region 14 can be different from each other, by following the above described Equation 6.

Accordingly, the display body 50 can display a visible image on the display body 50, in other words, a developed image formed by visualizing the latent image stored in the oriented film 10, based on differences among the transmissivities T in the first region 11 to the fourth region 14. When the observer observes the light emitted from the display body 50 without the aid of a pair of polarization filters, an image that can be visually recognized by the observer is not displayed on the display body 50.

The image displayed by the display body 50 changes in the following manner, for instance, when the direction of the polarization axis of the polarization filter is rotated in the plane of the polarization filter.

In the following, the display body 50 will be described as one example at the time when θ1=0°, L=0, M=−1 and N=0, in other words, in which θ1=0°, θ2=22.5°, θ3=−45° and θ4=67.5°.

The angle formed by the above described X-axis and each of the polarization axes of a pair of the polarization filters positioned in a state of parallel nicols with the display body 50 in between, in other words, the angle formed by the X-axis and each of the polarization axis of the linearly polarized light incident on the display body 50 and the polarization axis of the linearly polarized light emitted by the display body 50, is a polarization axis angle θP. In addition, the transmissivity of the first region 11 is transmissivity T1, the transmissivity of the second region 12 is transmissivity T2, the transmissivity of the third region 13 is transmissivity T3, and the transmissivity of the fourth region 14 is T4.

Figure 14:
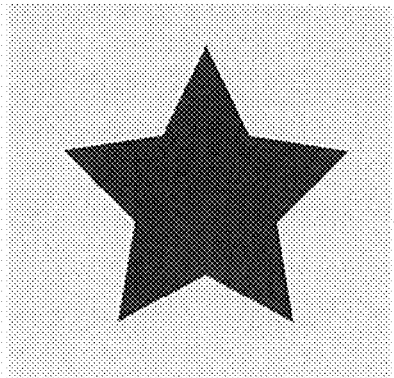
FIG. 14 is a plan view showing an image displayed by the display body.

As shown in FIG. 14, when the polarization axis angle θP is 11.25°, each of the polarization axes of a pair of polarization filters is parallel to the bisector of an angle between a straight line forming the first orientation angle θ1 with the X-axis in the first region 11 and a straight line forming the second orientation angle θ2 with the X-axis in the second region 12. In addition, the angle formed by the polarization axis of the polarization filter and the straight line forming the third orientation angle θ3 with the X-axis in the third region 13 is equal to the angle formed by the polarization axis of the polarization filter and the straight line forming the fourth orientation angle θ4 with the X-axis in the fourth region 14.

At this time, the angle formed by the polarization axis of the polarization filter and the straight line forming the first orientation angle θ1 with the X-axis in the first region 11 is the absolute value (|θP−θ1|) of the value obtained by subtracting the first orientation angle θ1 from the polarization axis angle θP and is 11.25°. In addition, the angle formed by the polarization axis of the polarization filter and the straight line forming the second orientation angle θ2 with the X-axis in the second region 12 is the absolute value (|θP−θ2|) of the value obtained by subtracting the second orientation angle θ2 from the polarization axis angle θP and is 11.25°.

Accordingly, each of the transmissivity T1 in the first region 11 and the transmissivity T2 in the second region 12 is calculated with the use of the above described Equation 6, in the following manner.

$T1=T2=100\times\cos^2[(\pi/180°)\times2\times11.25°]=85/4\%$

On the other hand, the angle formed by the polarization axis of the polarization filter and the straight line forming the third orientation angle θ3 with the X-axis in the third region 13 is the absolute value (|θP−θ3|) of the value obtained by subtracting the third orientation angle θ3 from the polarization axis angle θP and is 56.25°. In addition, the angle formed by the polarization axis of the polarization filter and the straight line forming the fourth orientation angle θ4 with the X-axis in the fourth region 14 is the absolute value (|θP−θ4|) of the value obtained by subtracting the fourth orientation angle θ4 from the polarization axis angle θP and is 56.25°.

Accordingly, each of the transmissivity T3 in the third region 13 and the transmissivity T4 in the fourth region 14 is calculated with the use of the above described Equation 6, in the following manner.

$T3=T4=100\times\cos^2[(\pi/180°)\times2\times56.25°]=14.46\%$

Therefore, in the display body 50, the first region 11 and the second region 12 are observed as a negative image, and on the other hand, the third region 13 and the fourth region 14 are observed as a positive image. As a result, the display body 50 displays the first image as a positive image. At this time, the transmissivity difference ΔT between the transmissivity of the first image and the transmissivity of the portions other than the first image in the oriented film 10 is equal to the difference between the transmissivity T1 of the first region 11 and the transmissivity T3 of the third region 13. Specifically, the transmissivity difference ΔT is calculated in the following manner.

$\Delta T=T1-T3=70.8\%$

Thus, in the oriented film 10, the transmissivity difference ΔT between the transmissivity of the first image and the transmissivity of the portions other than the first image in the oriented film 10 is 70.8%. As a result, the display body 50 can selectively display the first image among the latent images stored in the display body 50.

Figure 15:
FIG. 15 is a plan view showing an image displayed by the display body.

As shown in FIG. 15, when the polarization axis angle θP is 33.75°, the polarization axis of each of a pair of the polarization filters is parallel to the bisector of an angle between the straight line forming the first orientation angle θ1 with the X-axis in the first region 11 and a straight line forming the fourth orientation angle θ4 with the X-axis in the fourth region 14.

At this time, the angle formed by the polarization axis of the polarization filter and the straight line forming the first orientation angle θ1 with the X-axis in the first region 11 is equal to the angle formed by the polarization axis of the polarization filter and the straight line forming the fourth orientation angle θ4 in the fourth region 14. The angle formed by the polarization axis of the polarization filter and the straight line forming the first orientation angle θ1 with the X-axis in the first region 11 is the absolute value (|θP−θ1|) of the value obtained by subtracting the first orientation angle θ1 from the polarization axis angle θP. On the other hand, the angle formed by the polarization axis of the polarization filter and the straight line forming the fourth orientation angle θ4 with the X-axis in the fourth region 14 is the absolute value (↑θP−θ4|) of the value obtained by subtracting the fourth orientation angle θ4 from the polarization axis angle θP. These angles are all 33.75°.

Accordingly, each of the transmissivity T1 in the first region 11 and the transmissivity T4 in the fourth region 14 is calculated with the use of the above described Equation 6, in the following manner.

$$T1=T4=100\times\cos^2[(\pi/180°)\times 2\times 33.75°]=14.6\%$$

On the other hand, the angle formed by the polarization axis of the polarization filter and the straight line forming the second orientation angle θ2 with the X-axis in the second region 12 is the absolute value (|θP−θ2|) of the value obtained by subtracting the second orientation angle θ2 from the polarization axis angle θP, and is 11.25°. In addition, the angle formed by the polarization axis of the polarization filter and the straight line having the third orientation angle θ3 in the third region 13 is the absolute value (|θP−θ3|) of the value obtained by subtracting the third orientation angle θ3 from the polarization axis angle θP, and is 78.75°.

Accordingly, each of the transmissivity T2 in the second region 12 and the transmissivity T3 in the third region 13 is calculated with the use of the above described Equation 6, in the following manner.

$$T2 = 100\times\cos^2[(\pi/180°)\times 2\times 11.25°]$$
$$= 100\times\cos^2[(\pi/180°)\times 2\times 78.75°] = 85.4\%$$

Therefore, in the display body 50, the first region 11 and the fourth region 14 are observed as a positive image, and on the other hand, the second region 12 and the third region 13 are observed as a negative image. As a result, the display body 50 displays the second image as a positive image. At this time, the transmissivity difference ΔT between the transmissivity of the second image and the transmissivity of the portions other than the second image in the oriented film 10 is equal to the difference between the transmissivity T2 of the second region 12 and the transmissivity T1 of the first region 11. Specifically, the transmissivity difference ΔT is calculated in the following manner.

$$\Delta T=T2-T1=70.8\%$$

Thus, in the oriented film 10, the transmissivity difference ΔT between the transmissivity of the second image and the transmissivity of the portions other than the second image in the oriented film 10 is 70.8%. As a result, the display body 50 can selectively display the second image among the latent images stored in the display body 50.

Figure 16:
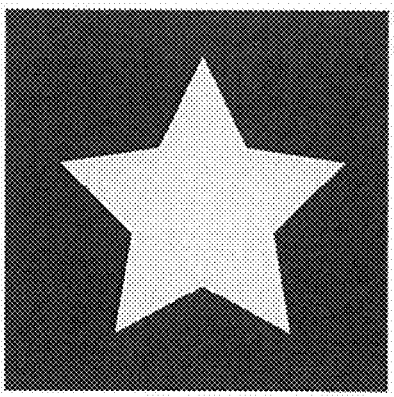
FIG. 16 is a plan view showing an image displayed by the display body.

As shown in FIG. 16, when the polarization axis angle θP is 56.25°, the transmissivity T1 in the first region 11 and the transmissivity T2 in the second region 12 are calculated with the use of the above described Equation 6, in the following manner.

$$T1 = 100\times\cos^2[(\pi/180°)\times 2\times 56.25°]$$
$$= 100\times\cos^2[(\pi/180°)\times 2\times 33.75°] = T2 = 14.6\%$$

On the other hand, the transmissivity T3 in the third region 13 and the transmissivity T4 in the fourth region 14 are calculated with the use of the above described Equation 6, in the following manner.

$$T3 = 100\times\cos^2[(\pi/180°)\times 2\times 78.75°]$$
$$= 100\times\cos^2[(\pi/180°)\times 2\times 11.25°] = T4 = 85.4\%$$

Therefore, in the display body 50, the first region 11 and the second region 12 are observed as a negative image, and on the other hand, the third region 13 and the fourth region 14 are observed as a positive image. As a result, the display body 50 displays the first image as a negative image. At this time, the transmissivity difference ΔT between the transmissivity of the first image and the transmissivity of the portions other than the first image in the oriented film 10 is equal to the difference between the transmissivity T3 of the third region 13 and the transmissivity T1 of the first region 11. Specifically, the transmissivity difference ΔT is calculated in the following manner.

$$\Delta T=T3-T1=70.8\%$$

Thus, in the oriented film 10, the transmissivity difference ΔT between the transmissivity of the first image and the transmissivity of the portions other than the first image in the oriented film 10 is 70.8%. As a result, the display body 50 can selectively display the first image among the latent images stored in the display body 50.

Figure 17:
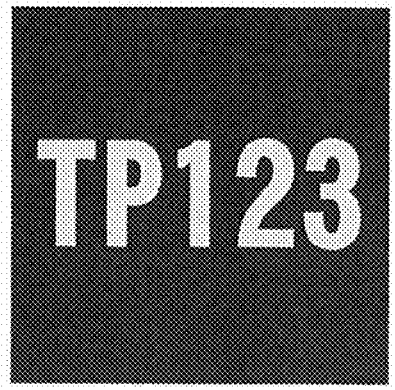
FIG. 17 is a plan view showing an image displayed by the display body.

As shown in FIG. 17, when the polarization axis angle θP is 78.75°, each of the transmissivity T1 in the first region 11 and the transmissivity T4 in the fourth region 14 is calculated with the use of the above described Equation 6, in the following manner.

$$T1 = 100\times\cos^2[(\pi/180°)\times 2\times 78.75°]$$
$$= 100\times\cos^2[(\pi/180°)\times 2\times 11.25°] = T4 = 85.4\%$$

On the other hand, each of the transmissivity T2 in the second region 12 and the transmissivity T3 in the third region 13 is calculated with the use of the above described Equation 6, in the following manner.

$$T2=T3=100\times\cos^2[(\pi/180°)\times 2\times 56.25°]=14.6\%$$

Therefore, in the display body 50, the first region 11 and the fourth region 14 are observed as a positive image, and on the other hand, the second region 12 and the third region 13 are observed as a negative image. As a result, the display body 50 displays the second image as a negative image. At this time, the transmissivity difference ΔT between the transmissivity of the second image and the transmissivity of the portions other than the second image in the oriented film 10 is equal to the difference between the transmissivity T1 of the first region 11 and the transmissivity T2 of the second region 12. Specifically, the transmissivity difference ΔT is calculated in the following manner.

$$\Delta T=T1-T2=70.8\%$$

Thus, in the oriented film 10, the transmissivity difference ΔT between the transmissivity of the second image and the transmissivity of the portions other than the second image in the oriented film 10 is 70.8%. As a result, the display body 50 can selectively display the second image among the latent images stored in the display body 50.

As has been described above, the display body 50 can display the first image and the second image as positive images and display the first image and the second image as negative images through changes in that the polarization axis angle θP of the polarization axis of the polarization filter, which is used for the observation of the display body 50. Therefore, an observer who knows that the latent image becomes visible when the display body 50 is observed under the above described conditions is allowed to determine whether an article having the display body 50 is an authentic product or a counterfeit by determining whether or not the display body 50 can individually display each of two latent images.

Figure 18:
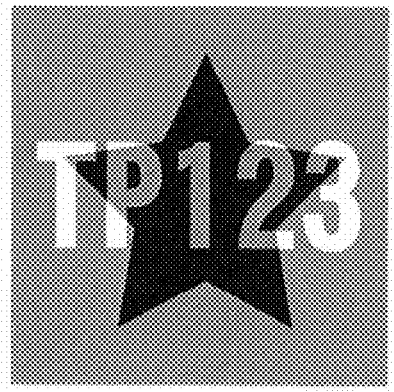
FIG. 18 is a plan view showing an image displayed by the display body.

On the other hand, as shown in FIG. 18, when the polarization axis angle θP is 0°, the transmissivity T1 in the first region 11 is calculated from the above described Equation 6, in the following manner.

$$T1 = 100 \times \cos^2[(\pi/180°) \times 2 \times 0°] = 100\%$$

the other hand, the transmissivity T2 in the second region 12 and the transmissivity T4 in the fourth region 14 are calculated with the use of the above described Equation 6, in the following manner.

$$T2 = 100 \times \cos^2[(\pi/180°) \times 2 \times 22.5°]$$
$$= 100 \times \cos^2[(\pi/180°) \times 2 \times 67.5°] = T4 = 6.25\%$$

Furthermore, the transmissivity T3 in the third region 13 is calculated with the use of the above described Equation 6, in the following manner.

$$T3 = \cos^2[(\pi/180°) \times 2 \times 45°] = 25\%$$

When the polarization axis angle θP is 90°, the transmissivities in the first region 11 to the fourth region 14 are the same values as those at the time when the polarization axis angle θP is 0°.

Figure 19:
FIG. 19 is a plan view showing an image displayed by the display body.

As shown in FIG. 19, when the polarization axis angle θP is 22.5°, each of the transmissivity T1 in the first region 11 and the transmissivity T3 in the third region 13 is calculated with the use of the above described Equation 6, in the following manner.

$$T1 = T3 = 100 \times \cos^2[(\pi/180°) \times 2 \times 22.5°] = 6.25\%$$

On the other hand, the transmissivity T2 in the second region 12 is calculated with the use of the above described Equation 6, in the following manner.

$$T2 = 100 \times \cos^2[(\pi/180°) \times 2 \times 0°] = 100\%$$

Furthermore, the transmissivity T4 in the fourth region 14 is calculated with the use of the above described Equation 6, in the following manner.

$$T4 = 100 \times \cos^2[(\pi/180°) \times 2 \times 45°] = 25\%$$

Figure 20:
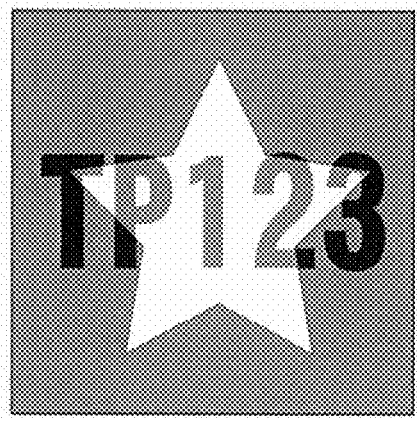
FIG. 20 is a plan view showing an image displayed by the display body.

As shown in FIG. 20, when the polarization axis angle θP is 45°, the transmissivity T1 in the first region 11 is calculated with the use of the above described Equation 6, in the following manner.

$$T1 = 100 \times \cos^2[(\pi/180°) \times 2 \times 45°] = 25\%$$

On the other hand, each of the transmissivity T2 in the second region 12 and the transmissivity T4 in the fourth region 14 is calculated with the use of the above described Equation 6, in the following manner.

$$T2 = T4 = 100 \times \cos^2[(\pi/180°) \times 2 \times 22.5°] = 6.25\%$$

Furthermore, the transmissivity T3 in the third region 13 is calculated with the use of the above described Equation 6, in the following manner.

$$T3 = 100 \times \cos^2[(\pi/180°) \times 2 \times 90°] = 100\%$$

Figure 21:
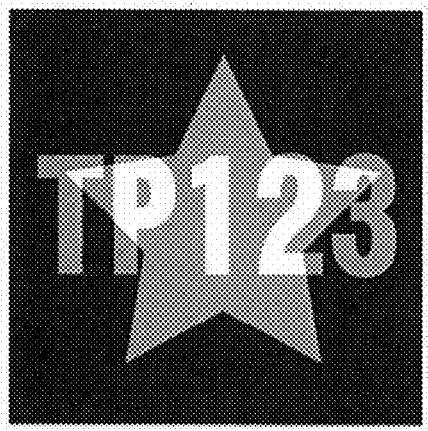
FIG. 21 is a plan view showing an image displayed by the display body.

As shown in FIG. 21, when the polarization axis angle θP is 67.5°, each of the transmissivity T1 in the first region 11 and the transmissivity T3 in the third region 13 is calculated with the use of the above described Equation 6, in the following manner.

$$T1 = 100 \times \cos^2[(\pi/180°) \times 2 \times 67.5°]$$
$$= 100 \times \cos^2[(\pi/180°) \times 2 \times 22.5°] = 6.25\%$$

On the other hand, the transmissivity T2 in the second region 12 is calculated with the use of the above described Equation 6, in the following manner.

$$T2 = 100 \times \cos^2[(\pi/180°) \times 2 \times 45°] = 25\%$$

Furthermore, the transmissivity T4 in the fourth region 14 is calculated with the use of the above described Equation 6, in the following manner.

$$T4 = 100 \times \cos^2[(\pi/180°) \times 2 \times 0°] = 100\%$$

Thus, when the polarization axis angle θP is 0°, 22.5°, 45°, 67.5°, and 90°, the display body 50 displays the first image and the second image in such a state that the images are overlaid on each other. Specifically, only when the polarization axis angle θP is a predetermined angle, the display body 50 displays one of the first image and the second image. Therefore, it is difficult for a third person to notice that the display body 50 stores the two latent images that are overlaid on each other therein, as compared to the case where the display body 50 displays one of the first image and the second image regardless of the polarization axis angle θP.

The above described method for manufacturing an oriented film and the method for manufacturing a display body have the following advantages.

(1) Four regions having different orientation angles from each other are formed by being irradiated with three polarized light having different polarization angles from each other. At this time, two regions among the four regions are irradiated with each of the first polarized light P1 and the second polarized light P2, and on the other hand, all of the four regions are irradiated with the third polarized light P3. At this time, one of the polarization angles for forming the third orientation angle θ3 is less than the third orientation angle θ3, and the intensity of the third polarized light P3, with which the entire photosensitive film is irradiated, is smaller than the intensities of the first polarized light P1 and the second polarized light P2. Therefore, the four regions having different orientation angles from each other can be formed by being irradiated with the three polarized light. Therefore, the oriented film can be formed by an easier method than such a method in which each of the four regions is irradiated individually with polarized light peculiar to each of the regions.

(2) The photosensitive film is irradiated with the third polarized light, which has the largest polarization angle, in a state in which a part of photosensitive molecules that form the photosensitive film already has a predetermined orientation angle. Therefore, the number of the photosensitive molecules having the orientation angles corresponding to the third polarized light among the photosensitive molecules that constitute the photosensitive film is less likely to be excessive than such a method in which the photosensitive film is irradiated with the third polarized light in the first step or the second step. Therefore, the orientation angle in each of the regions is restrained from being significantly larger than the desired orientation angle.

(3) The first polarization angle is smaller than the second orientation angle $\theta 2$. Thus, even when the photosensitive film is irradiated with the third polarized light, which is has a larger angle, in the third step, the first orientation angle $\theta 1$ is unlikely to exceed the desired orientation angle.

(4) The second polarized light is smaller than the third polarization angle. Thus, even when the photosensitive film is irradiated with the third polarized light, which is polarized light having a larger angle, in the third step, the third orientation angle $\theta 3$ is unlikely to exceed the desired orientation angle.

(5) The intensity of the first polarized light, which has the smallest angle, is largest. Thus, even when the photosensitive film is irradiated with the second polarized light and/or the third polarized light each having the larger polarization angle, after having been irradiated with the first polarized light, the orientation angle in each of the regions is unlikely to exceed the desired orientation angle.

(6) The photosensitive film is irradiated with the polarized light in increasing order of the polarization angle. Thus, the angle of the polarized light to irradiate is less likely to be mistaken than such a method in which the order of the irradiation is not associated with the order of the size of the angle of the polarized light.

The above described embodiment may be modified as follows.

The first irradiation step is performed prior to the second irradiation step, and the second irradiation step is performed prior to the third irradiation step. The order is not limited to this order, and the order of the first irradiation step, the second irradiation step and the third irradiation step may be arbitrarily changed as long as a step of irradiating the first region and the second region with the first polarized light P1 is performed as the first irradiation step, a step of irradiating the second region and the third region with the second polarized light P2 is performed as the second irradiation step, and a step of irradiating the first region to the fourth region with the third polarized light P3 is performed as the third irradiation step.

In the first irradiation step, the photosensitive film 22 is irradiated with the first polarized light P1, which has the smallest polarization angle. The polarization angle is not limited to this angle, and the polarization angle of the first polarized light P1 may be larger than the polarization angle of the second polarized light P2. Specifically, the polarization angle of the first polarized light P1 may be the second polarization angle $\theta b$ or the third polarization angle $\theta c$, and the polarization angle of the second polarized light P2 may be an angle smaller than the polarization angle of the first polarized light P1. In this case, the intensity of the second polarized light P2 is made higher than the intensity of the first polarized light P1, and thereby an advantage similar to the above described advantage (5) can be obtained.

When the polarization angle of the second polarized light P2 is the second polarization angle $\theta b$, the second polarization angle $\theta b$ may be the third orientation angle $\theta 3$ of the third region 13 or larger. In this case, the polarization angle of the third polarized light P3, with which the third region 13 is irradiated, is set at the first polarization angle $\theta a$, which is smaller than the second polarization angle $\theta b$, corresponding to the setting that the second polarization angle $\theta b$ is larger than the third orientation angle $\theta 3$, and the angle of the first polarization angle $\theta a$ is set smaller than the third orientation angle $\theta 3$. Thereby, it is possible to set the orientation angle of the third region 13 at the third orientation angle $\theta 3$.

The polarization angle of the first polarized light P1 may also be a polarization angle that is the second polarization angle $\theta b$ or the third polarization angle $\theta c$, each of which is a polarization angle larger than the first polarization angle $\theta a$, and also is larger than the second orientation angle $\theta 2$. In this case, the polarization angle of the second polarized light P2, with which the first region 11 is irradiated, may be a polarization angle that is smaller than the polarization angle of the first polarized light P1, corresponding to the setting that the polarization angle of the first polarized light P1 has been set large. For instance, if the first polarized light P1 has the second polarization angle $\theta b$, the second polarized light P2 may have the first polarization angle $\theta a$, and if the first polarized light P1 has the third polarization angle $\theta c$, the second polarized light P2 may have the second polarization angle $\theta b$ or the first polarization angle $\theta a$. Thereby, it is possible to obtain an advantage that the orientation angle of the second region 12 resists exceeding the second orientation angle $\theta 2$.

The polarization angle of the third polarized light P3, with which the photosensitive film is irradiated in the third irradiation step, does not necessarily need to be the third polarization angle $\theta c$, but may be the second polarization angle $\theta b$ or the first polarization angle $\theta a$, which is a polarization angle smaller than the third polarization angle $\theta c$. For instance, when the polarization angle of the third polarized light P3 is the first polarization angle $\theta a$, the fourth orientation angle $\theta 4$ of the fourth region 14 is equal to the first polarization angle $\theta a$. Thus, the photosensitive film may be irradiated with the polarized light so that each of the integer L and the integer M is larger than the integer N, in three integers contained in the above described Equation 1 to Equation 3. Thereby, even when the polarization angle of the third polarized light P3 is the first polarization angle $\theta a$, it is possible to form the oriented film 10 so as to have the first region 11 to the fourth region 14, which have different orientation angles from each other. For instance, when the polarization angle of the third polarized light P3 is the second polarization angle $\theta b$, the fourth orientation angle $\theta 4$ of the fourth region 14 is equal to the second polarization angle $\theta b$. Thus, it is preferable that the polarized light irradiates the photosensitive film so that each of the integer L and the integer M is larger than the integer N.

The integer L may be numbers other than 0, the integer M may be numbers other than $-1$, and the integer N may be numbers other than 0. For instance, when the integer L, the integer M and the integer N satisfy a relationship of $L=N=M+1$, and for instance, when the M is 1, an image equivalent to the above described embodiment is displayed on the display body 50. That is, if the first orientation angle $\theta 1$ to the fourth orientation angle $\theta 4$ satisfy Equation 1 to Equation 3, the display body 50 displays the first image when the polarization axis angle $\theta P$ is any of angles contained in 0° or more and 90° or less, and the display body 50 displays the second image when the polarization axis angle $\theta P$ is different from the angle at which the first image is displayed.

The first orientation angle $\theta 1$ may be angles other than 0°, and the first orientation angle $\theta 1$ may be an arbitrary angle as long as the first orientation angle $\theta 1$, the second orientation angle θ2, the third orientation angle θ3 and the fourth orientation angle θ4 satisfy the above described Equation 1 to Equation 3.

EXAMPLES

Examples and comparative examples of a method for manufacturing an oriented film and a method for manufacturing a display body will be described below.

Example 1

Firstly, an ink having a light-shielding property (SS66 911 black, made by TOYO INK MFG. CO., LTD.) was applied to a mask substrate 31, which was a transparent plastic plate, with a screen printing method, and a first mask 30 was obtained, which had a first light-shielding portion 33 having a thickness of 2 μm and a first opening 32. In addition, an ink having a light-shielding property (the same as the above description) was applied to a mask substrate 41, which was a similar transparent plastic plate, with the screen printing method, and a second mask 40 was obtained, which had a second light-shielding portion 43 having a thickness of 2 μm and a second opening 42.

Next, a polyester film (Lumirror 19F60, made by Toray Industries, Inc.) was used as a supporting substrate 21, and a photo-alignment agent (IA-01, made by DIC Corporation) was applied onto the supporting substrate 21 so as to have a thickness of 0.1 μm, and a photosensitive film 22 was formed. Thereby, the photosensitive substrate 20 was obtained.

As the first irradiation step, the photosensitive film 22 was irradiated with linearly polarized light with the use of the first mask 30, in a state in which the angle formed by the X-axis of the photosensitive film 22 and the optical axis of the linearly polarized light was −9°. As the second irradiation step, the photosensitive film 22 was irradiated with linearly polarized light with the use of the second mask 40, in a state in which the angle formed by the above described straight line and the optical axis of the linearly polarized light was 36°. Furthermore, as the third irradiation step, the entire photosensitive film 22 was irradiated with linearly polarized light, in a state in which the angle formed by the above described straight line and the optical axis of the linearly polarized light was 67.5°.

The intensity of the linearly polarized light in the first irradiation step was set at 86.4 mJ/cm$^2$, the intensity of the linearly polarized light in the second irradiation step was set at 64.8 mJ/cm$^2$, and the intensity of the linearly polarized light in the third irradiation step was set at 36 mJ/cm$^2$.

Thereby, the oriented film 10 was obtained, which had the first region 11, the second region 12, the third region 13 and the fourth region 14.

Furthermore, a liquid crystal material (UV curable liquid crystal UCL-008, made by DIC Corporation) was applied onto the oriented film 10, which was manufactured with the above described method, with a micro gravure coating method, the liquid crystal material was irradiated with ultraviolet rays under an oxygen atmosphere, and the liquid crystal material was cured. Thereby, the phase difference layer 51 was formed on the oriented film 10, and thereby the display body 50 was obtained.

The display body 50 was held between two polarization filters in a state of parallel nicols, and light emitted from the display body 50 was further observed while the polarization axes of each of the polarization filters were rotated in the plane of the polarization filter. Thereby, when the polarization axis angle θP was any one of 11.25°, 33.75°, 56.25° and 78.75°, it was recognized that one of the two latent images became visible, as shown in FIGS. 14 to 17.

Specifically, it was recognized that in the first region 11, the first orientation angle θ1 was 0°, which was the angle formed by the X-axis in the oriented film 10 and the orientation regulating direction of the first region 11, due to an interaction between −9°, which was the first polarization angle θa, and 67.5°, which was the third polarization angle θc. It was also recognized that in the second region 12, the second orientation angle θ2 was 22°, which was the angle formed by the above described straight line and the orientation regulating direction of the second region 12, due to an interaction among −9°, which was the first polarization angle θa, 36°, which was the second polarization angle θb, and 67.5°, which was the third polarization angle θc.

It was recognized that in the third region 13, the third orientation angle θ3 was 46°, which was the angle formed by the above described straight line and the orientation regulating direction of the third region 13, due to an interaction between 36°, which was the second polarization angle θb, and 67.5°, which was the third polarization angle θc. Furthermore, it was recognized that in the fourth region 14, the fourth orientation angle θ4 was 67.5°, which was the angle formed by the above described straight line and the orientation regulating direction of the fourth region 14, due to 67.5°, which was the third polarization angle θc.

Example 2

A first mask 30, a second mask 40, and a photosensitive substrate 20 were obtained with a method similar to that in Example 1.

As the first irradiation step, a photosensitive film 22 was irradiated with linearly polarized light with the use of the first mask 30, in a state in which the angle formed by the X-axis in a photosensitive film 22 and the optical axis of the linearly polarized light was −9°. As the second irradiation step, the photosensitive film 22 was irradiated with linearly polarized light with the use of the second mask 40, in a state in which the angle formed by the above described straight line and the optical axis of the linearly polarized light was 41°. Furthermore, as the third irradiation step, the entire photosensitive film 22 was irradiated with linearly polarized light, in a state in which the angle formed by the above described straight line and the optical axis of the linearly polarized light was 67.5°.

The intensity of the linearly polarized light in the first irradiation step was set at 86.4 mJ/cm$^2$, the intensity of the linearly polarized light in the second irradiation step was set at 86.4 mJ/cm$^2$, and the intensity of the linearly polarized light in the third irradiation step was set at 36 mJ/cm$^2$.

Thereby, the oriented film 10 was obtained, which had a first region 11, a second region 12, a third region 13, and a fourth region 14. A phase difference layer 51 was formed on the oriented film 10 with a method similar to that in Example 1, and thereby a display body 50 was obtained.

The display body 50 was held between two polarization filters in a state of parallel nicols, and light emitted from the display body 50 was observed while the polarization axes of each of the polarization filters were rotated in the plane of the polarization filter. Thereby, when the polarization axis angle θP was any one of 11.25°, 33.75°, 56.25° and 78.75°, it was recognized that one of the two latent images became visible, as shown in FIGS. 14 to 17.

Specifically, it was recognized that in the first region 11, the first orientation angle θ1 was 0°, which was the angle formed by the X-axis in the oriented film 10 and the orientation regulating direction of the first region 11, due to an interaction between −9°, which was the first polarization angle θa, and 67.5°, which was the third polarization angle θc. It was also recognized that in the second region 12, the second orientation angle θ2 was 22°, which was the angle formed by the above described straight line and the orientation regulating direction of the second region 12, due to an interaction among −9°, which was the first polarization angle θa, 41°, which was the second polarization angle θb, and 67.5°, which was the third polarization angle θc.

It was recognized that in the third region 13, the third orientation angle θ3 was 46°, which was the angle formed by the above described straight line and the orientation regulating direction in the third region 13, due to an interaction between 41°, which was the second polarization angle θb and 67.5°, which was the third polarization angle θc. Furthermore, it was recognized that in the fourth region 14, the fourth orientation angle θ4 was 67.5°, which was the angle formed by the above described straight line and the orientation regulating direction of the fourth region 14, due to 67.5°, which was the third polarization angle θc.

Example 3

A first mask 30, a second mask 40, and a photosensitive substrate 20 were obtained with a method similar to that in Example 1.

As the third irradiation step, the entirety of a photosensitive film 22 was irradiated with linearly polarized light, in a state in which the angle formed by the X-axis in the photosensitive film 22 and the polarization axis of the linearly polarized light was 67.5°. As the first irradiation step, the photosensitive film 22 was irradiated with linearly polarized light with the use of the first mask 30, in a state in which the angle formed by the above described straight line and the linearly polarized light was −9°. Furthermore, as the second irradiation step, the photosensitive film 22 was irradiated with linearly polarized light with the use of the second mask 40, in a state in which the angle formed by the above described straight line and the polarization axis of the linearly polarized light was 41°.

The intensity of the linearly polarized light in the first irradiation step was set at 36 mJ/cm$^2$, the intensity of the linearly polarized light in the second irradiation step was set at 86.4 mJ/cm$^2$, and the intensity of the linearly polarized light in the third irradiation step was set at 64.8 mJ/cm$^2$.

Thereby, an oriented film 10 was obtained, which had a first region 11, a second region 12, a third region 13, and a fourth region 14. The phase difference layer 51 was formed on the oriented film 10 with a method similar to that in Example 1, and thereby a display body 50 was obtained.

The display body 50 was held between two polarization filters in a state of parallel nicols, and light emitted from the display body 50 was observed while the polarization axes of each of the polarization filters were rotated in the plane of the polarization filter. Thereby, when the polarization axis angle θP was any one of 11.25°, 33.75°, 56.25° and 78.75°, it was recognized that one of the two latent images became visible, as shown in FIGS. 14 to 17.

Specifically, it was recognized that in the first region 11, the first orientation angle θ1 was 0°, which was the angle formed by the X-axis in the oriented film 10 and the orientation regulating direction of the first region 11, due to an interaction between −9°, which was the first polarization angle θa, and 67.5°, which was the third polarization angle θc. It was also recognized that in the second region 12, the second orientation angle θ2 was 22°, which was the angle formed by the above described straight line and the orientation regulating direction of the second region 12, due to an interaction among −9°, which was the first polarization angle θa, 41°, which was the second polarization angle θb, and 67.5°, which was the third polarization angle θc.

It was recognized that in the third region 13, the third orientation angle θ3 was 46°, which was the angle formed by the above described straight line and the orientation regulating direction in the third region 13, due to an interaction between 41°, which was the second polarization angle θb, and 67.5°, which was the third polarization angle θc. Furthermore, it was recognized that in the fourth region 14, the fourth orientation angle v4 was 67.5°, which was the angle formed by the above described straight line and the orientation regulating direction of the fourth region 14, due to 67.5°, which was the third polarization angle θc.

The present inventors found out that the display body 50 was capable of individually displaying the first image and the second image not only under the conditions of the above described Example 1 to Example 3, but also under any conditions possible as long as the three rays of polarized light, with which the photosensitive film 22 is irradiated in the first irradiation step to the third irradiation step, satisfied the following conditions.

(A) The polarization angles of the first polarized light P1 to the third polarized light P3 are different from each other.

(B) The three polarization angles consist of the first polarization angle, the second polarization angle θb, which is larger than the first polarization angle θa, and the third polarization angle θc, which is larger than the second polarization angle θb, and one of the polarization angles for forming the third orientation angle θ3 among the three polarization angles is less than the third orientation angle θ3.

(C) The intensity of the third polarized light P3, with which the photosensitive film is irradiated at the third polarization angle θc, is lower than the intensity of the first polarized light P1 and the intensity of the second polarized light P2.

Comparison Example 1

A first mask 30, a second mask 40, and a photosensitive substrate 20 were obtained with a method similar to that in Example 1.

As the first irradiation step, a photosensitive film 22 was irradiated with linearly polarized light with the use of the first mask 30, in a state in which the angle formed by the X-axis in the photosensitive film 22 and the polarization axis of the linearly polarized light was −9°. As the second irradiation step, the photosensitive film 22 was irradiated with linearly polarized light with the use of the second mask 40, in a state in which the angle formed by the above described straight line and the linearly polarized light was 36°. Furthermore, as the third irradiation step, the entire photosensitive film 22 was irradiated with linearly polarized light, in a state in which the angle formed by the above described straight line and the polarization axis of the linearly polarized light was 67.5°.

The intensity of the linearly polarized light in the first irradiation step was set at 86.4 mJ/cm$^2$, the intensity of the linearly polarized light in the second irradiation step was set at 86.4 mJ/cm$^2$, and the intensity of the linearly polarized light in the third irradiation step was set at 86.4 mJ/cm$^2$.

Thereby, an oriented film was obtained that had a first region, a second region, a third region, and a fourth region.

A phase difference layer was formed on the oriented film with a method similar to that in Example 1, and thereby a display body was obtained.

The display body was held between two polarization filters in a state of parallel nicols, and light emitted from the display body was observed while the polarization axes of each of the polarization filters were rotated in the plane of the polarization filter. At this time, it was recognized that even when the polarization axis angle θP was any angle contained in the range from 0° to 90°, the two latent images became visible in a state in which the images are overlaid on each other.

Comparison Example 2

A first mask 30, a second mask 40, and a photosensitive substrate 20 were obtained with a method similar to that in Example 1.

As the first irradiation step, a photosensitive film 22 was irradiated with linearly polarized light with the use of the first mask 30, in a state in which the angle formed by the X-axis in the photosensitive film 22 and the polarization axis of the linearly polarized light was −9°. As the second irradiation step, the photosensitive film 22 was irradiated with linearly polarized light with the use of the second mask 40, in a state in which the angle formed by the above described straight line and the linearly polarized light was 50°. Furthermore, as the third irradiation step, the entire photosensitive film 22 was irradiated with linearly polarized light, in a state in which the angle formed by the above described straight line and the polarization axis of the linearly polarized light was 67.5°.

The intensity of the linearly polarized light in the first irradiation step was set at 86.4 mJ/cm$^2$, the intensity of the linearly polarized light in the second irradiation step was set at 64.8 mJ/cm$^2$, and the intensity of the linearly polarized light in the third irradiation step was set at 36 mJ/cm$^2$.

Thereby, an oriented film was obtained that had the first region, the second region, the third region and the fourth region. The phase difference layer was formed on the oriented film with a method similar to that in Example 1, and thereby the display body was obtained.

The display body was held between two polarization filters in a state of parallel nicols, and light which was emitted from the display body was observed while the polarization axes of each of the polarization filters were rotated in the plane of the polarization filter. At this time, it was recognized that even when the polarization axis angle θP was any angle contained in a range from 0° to 90°, the two latent images became visible in a state in which the images are overlaid on each other.

What is claimed is:

1. A method for manufacturing an oriented film from a photosensitive film, wherein
the oriented film includes a first region having a first orientation direction, a second region having a second orientation direction, a third region having a third orientation direction, and a fourth region having a fourth orientation direction, the first orientation direction, the second orientation direction, the third orientation direction and the fourth orientation direction form, with respect to a straight line parallel to a plane of the oriented film, a first orientation angle θ1, a second orientation angle θ2, a third orientation angle θ3 and a fourth orientation angle θ4, respectively, and orientations of molecules in a first region, a second region, a third region and a fourth region of a phase difference layer are regulated in the first orientation direction, the second orientation direction, the third orientation direction and the fourth orientation direction, respectively, the first region, the second region, the third region and the fourth region of the phase difference layer are on the first region, the second region, the third region and the fourth region of the oriented film, respectively, and the first orientation angle θ1, the second orientation angle θ2, the third orientation angle θ3, and the fourth orientation angle θ4 satisfy the equations:

$$\theta2=\theta1+22.5° \text{ or } \theta1-157.5°,$$

$$\theta3=\theta1+135° \text{ or } \theta1-45°, \text{ and}$$

$$\theta4=\theta1+67.5° \text{ or } \theta1-112.5°,$$

the method comprising:
using a first mask, irradiating a first area and a second area of the photosensitive film with first polarized light having a first intensity;
using a second mask, irradiating the second area and a third area of the photosensitive film with second polarized light having a second intensity; and
without using the first mask and the second mask, irradiating the first area, the second area, the third area and a fourth area of the photosensitive film with third polarized light having a third intensity, wherein
the irradiation using the first polarized light and the third polarized light produces the first region of the oriented film from the first area of the photosensitive film, the first region of the oriented film having the first orientation angle θ1,
the irradiation using the first polarized light, the second polarized light and the third polarized light produces the second region of the oriented film from the second area of the photosensitive film, the second region of the oriented film having the second orientation angle θ2,
the irradiation using the second polarized light and the third polarized light produces the third region of the oriented film from the third area of the photosensitive film, the third region of the oriented film having the third orientation angle θ3,
the irradiation using the third polarized light produces the fourth region of the oriented film from the fourth area of the photosensitive film, the fourth region of the oriented film having the fourth orientation angle θ4,
the first polarized light, the second polarized light and the third polarized light have a first polarization angle, a second polarization angle and a third polarization angle, respectively, the first polarization angle, the second polarization angle and the third polarization angle are different from each other, the first polarization angle is an angle formed between a polarization axis of the first polarized light and the straight line, the second polarization angle is an angle formed between a polarization axis of the second polarized light and the straight line, and the third polarization angle is an angle formed between a polarization axis of the third polarized light and the straight line;
the polarization angle of one of the second polarized light and the third polarized light, with which the third area is irradiated, is smaller than the third orientation angle θ3, and
the third intensity is lower than the first intensity and the second intensity.

2. The method according to claim 1, wherein the third polarization angle is larger than the first polarization angle and the second polarization angle.

3. The method according to claim 2, wherein
the first polarization angle is smaller than the second polarization angle and the third polarization angle, and
the first polarization angle is smaller than the first orientation angle θ1.

4. The method according to claim 3, wherein
the second polarization angle is smaller than the third orientation angle θ3.

5. The method according to claim 4, wherein
the first intensity is higher than the second intensity.

6. The method according to claim 5, wherein
the irradiation with the first polarized light is performed prior to the irradiation with the second polarized light, and
the irradiation with the second polarized light is performed prior to the irradiation with the third polarized light.

7. A method for manufacturing a display body that includes an oriented film and a phase difference layer that covers the oriented film, the method comprising:
forming the oriented film by irradiating a photosensitive film with light; and
forming the phase difference layer that covers the oriented film, wherein
the oriented film includes a first region having a first orientation direction, a second region having a second orientation direction, a third region having a third orientation direction, and a fourth region having a fourth orientation direction, the first orientation direction, the second orientation direction, the third orientation direction and the fourth orientation direction form, with respect to a straight line parallel to a plane of the oriented film, a first orientation angle θ1, a second orientation angle θ2, a third orientation angle θ3 and a fourth orientation angle θ4, respectively, and orientations of molecules in a first region, a second region, a third region and a fourth region of the phase difference layer are regulated in the first orientation direction, the second orientation direction, the third orientation direction and the fourth orientation direction, respectively, the first region, the second region, the third region and the fourth region of the phase difference layer are on the first region, the second region, the third region and the fourth region of the oriented film, respectively, and
the first orientation angle θ1, the second orientation angle θ2, the third orientation angle θ3, and the fourth orientation angle θ4 satisfy the equations:

θ2=θ1+22.5° or θ1−157.5°,

θ3=θ1+135° or θ1−45°, and

θ4=θ1+67.5° or θ1−112.5°, the forming the oriented film comprising:
using a first mask, irradiating a first area and a second area of the photosensitive film with first polarized light having a first intensity;
using a second mask, irradiating the second area and a third area of the photosensitive film with second polarized light having a second intensity; and
without using the first mask and the second mask, irradiating the first area, the second area, the third area and a fourth area of the photosensitive film with third polarized light having a third intensity, wherein
the irradiation using the first polarized light and the third polarized light produces the first region of the oriented film from the first area of the photosensitive film, the first region of the oriented film having the first orientation angle θ1,
the irradiation using the first polarized light, the second polarized light and the third polarized light produces the second region of the oriented film from the second area of the photosensitive film, the second region of the oriented film having the second orientation angle θ2,
the irradiation using the second polarized light and the third polarized light produces the third region of the oriented film from the third area of the photosensitive film, the third region of the oriented film having the third orientation angle θ3,
the irradiation using the third polarized light produces the fourth region of the oriented film from the fourth area of the photosensitive film, the fourth region of the oriented film having the fourth orientation angle θ4,
the first polarized light, the second polarized light and the third polarized light have a first polarization angle, a second polarization angle and a third polarization angle, respectively, the first polarization angle, the second polarization angle and the third polarization angle are different from each other, each of the first polarization angle is an angle formed between a polarization axis of the first polarized light and the straight line, the second polarization angle is an angle formed between a polarization axis of the second polarized light and the straight line, and the third polarization angle is an angle formed between a polarization axis of the third polarized light and the straight line;
the three polarization angles include a first polarization angle, a the second polarization angle, which is larger than the first polarization angle, and a third polarization angle, which is larger than the second polarization angle,
the polarization angle of one of the second polarized light and the third polarized light, with which the third area is irradiated, is smaller than the third orientation angle θ3, and
the third intensity is lower than the first intensity and the second intensity.

8. The method according to claim 7, wherein the third polarization angle is larger than the first polarization angle and the second polarization angle.

9. The method according to claim 8, wherein
the first polarization angle is smaller than the second polarization angle and the third polarization angle, and
the first polarization angle is smaller than the first orientation angle θ1.

10. The method according to claim 9, wherein
the second polarization angle is smaller than the third orientation angle θ3.

11. The method according to claim 10, wherein
the first intensity is higher than the second intensity.

* * * * *